Figure 1:
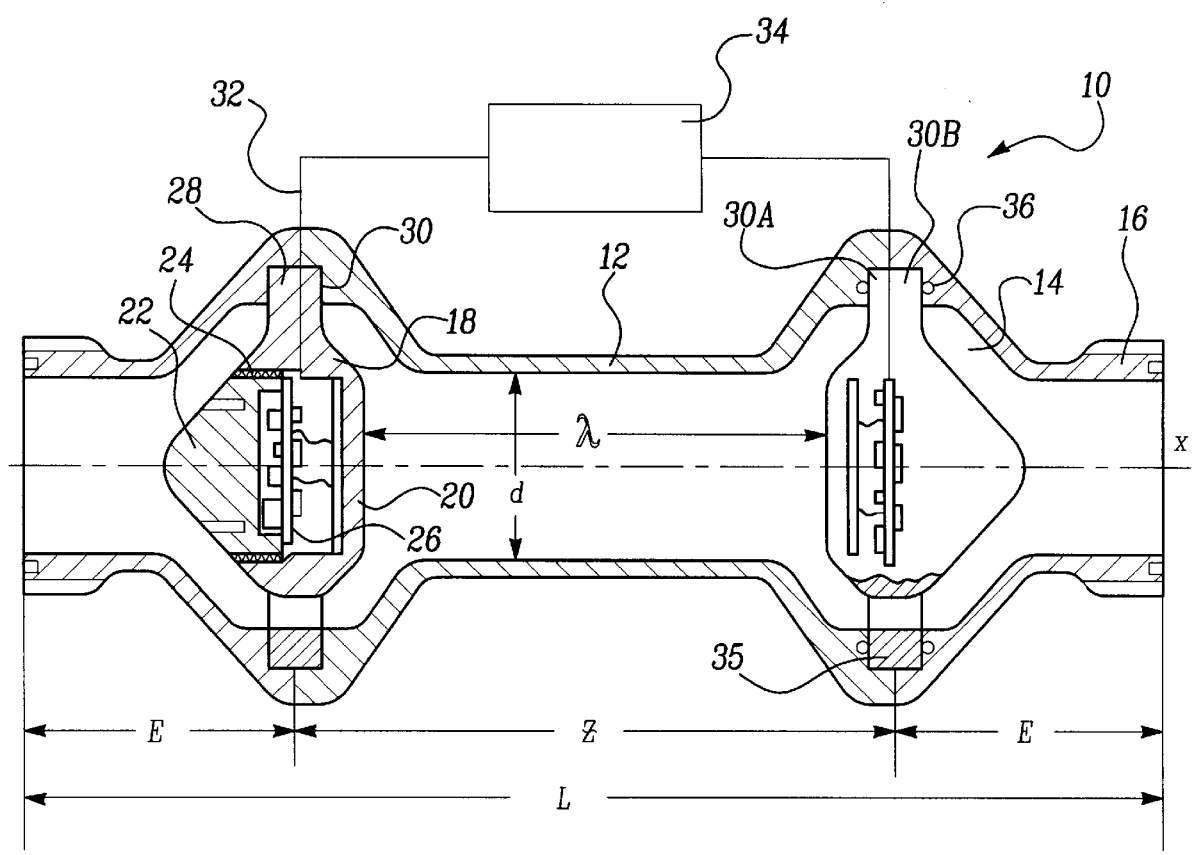

United States Patent
Schalk

[19]

[11] Patent Number: 5,905,207
[45] Date of Patent: May 18, 1999

[54] PROCESS FOR MEASURING THE FLOW RATE OF A FLUID

[75] Inventor: Adelbert Schalk, Wutoschingen-Horheim, Germany

[73] Assignee: Georg Fischer Rohrleitungssysteme AG, Switzerland

[21] Appl. No.: 08/833,306

[22] Filed: Apr. 4, 1997

[30] Foreign Application Priority Data

Apr. 4, 1996 [CH] Switzerland .............................. 0876/96

[51] Int. Cl.[6] ...................................................... G01F 1/66
[52] U.S. Cl. ........................................................ 73/861.28
[58] Field of Search ........................... 73/861.27, 861.28, 73/861.29, 861.31

[56] References Cited

U.S. PATENT DOCUMENTS 3,817,098  6/1974  Brown ................................... 73/194 A
4,365,518  12/1982 Zacharias, Jr. ......................... 73/861.31
5,035,147  7/1991  Woodward ............................ 73/861.29
5,461,931  10/1995 Gil ....................................... 73/861.28
5,594,181  1/1997  Stange .................................. 73/861.28

Primary Examiner—George Dombroske
Assistant Examiner—Jewel Thompson
Attorney, Agent, or Firm—Gifford, Krass, Groh, Sprinkle, Anderson & Citkowski, P.C.

[57] ABSTRACT

A device for measuring the flow rate of a fluid with ultrasonic has a measuring tube (12) with ultrasound transducers (26), arranged in the area of its ends, as well as connecting pieces (16) for the inflow and discharge of the fluid which are arranged coaxially with respect to one another. The measuring tube (12) is arranged coaxially with respect to the connecting pieces (16) and the ultrasonic transducers (26) are positioned between the measuring tube and the connecting pieces. With this arrangement, the effective length (1) of the ultrasonic measuring section may be increased when the laid length (L) is predetermined.

2 Claims, 1 Drawing Sheet

PROCESS FOR MEASURING THE FLOW RATE OF A FLUID

The invention relates to a device for measuring the flow rate of a fluid with ultrasound, with a measuring tube and with ultrasound transducers arranged in the area of the measuring tube ends, as well as connection pieces which are arranged coaxially with respect to each other, for the inflow and discharge of the fluid.

In order to determine the flow rate of a fluid medium, particularly of liquids, it is conventional to send ultrasound wave trains through a so-called measuring tube simultaneously from both end faces of the tube in the direction of flow and opposite to it through the liquid flowing inside the measuring tube. Due to the fluid flow, a transit-time difference occurs between the sound signals which is proportional to the central flow rate. Since the transit-time difference increases linearly with the length of the measuring tube, as long a measuring tube as possible is desirable. However, on the other hand, the maximum overall length of such flowmeters is given due to existing installation regulations.

For the purpose of increasing the effective length of the measuring tube in the case of a given maximum length DE-A-4415889 discloses arranging the measuring tube at an incline with respect to the axis of communication of the connecting pieces. However, this step leads to a protruding structure and therefore requires a large installation space. Due to the construction which is asymmetrical with respect to the flow profile and has some sharp edges, the maximum flow rate is limited due to the occurrence of a cavitation.

For this reason, it is the problem of the invention to construct a device of the initially mentioned type such that, for a given maximum overall length, a larger effective length of the ultrasound measuring section is possible without the need for a disproportionately large installation space. Furthermore, the manufacture of the flowmeter is to be economical and is to make a simple installation in existing pipeline systems possible.

In accordance with the invention, this task is solved in that the measuring tube is arranged coaxially with respect to the connecting pieces and the ultrasound transducers are positioned between the measuring tube and the connecting pieces.

In one advantageous embodiment of the device of the invention, the ultrasound transducers are arranged in an antechamber inside a housing which is enlarged with respect to the measuring tube and the connecting pieces. The housing may be closed on its side facing the connecting piece by a flow element which preferably can be unscrewed. This flow divider is preferably anchored by means of support flanges in the housing or pipe wall, whereby an optimum influence on the flow, for example due to superimposed twisting, becomes possible due to the design of the support flanges. The flow element, which can be unscrewed, makes access to the ultrasound transducer possible, so that maintenance work can be carried out from the connecting piece.

In a particularly preferred embodiment of the device of the invention, the measuring tube is a part of a central component and each connecting piece is a part of an end piece to be connected to the central component, with the support flanges of the housings placed into corresponding recesses on the central component and on the end pieces and held there after assembly. The central component and the end pieces, depending on the range of application, may be produced from metal or from a synthetic material. In the same way, the material selection for the housing and the flow element depends on the properties of the fluids to be transported inside the pipeline systems.

If the device is produced from plastic the connection lines to the ultrasound transducer may be injection-molded directly into the support flange of the housing.

As a completely plastic embodiment, the device of the invention is suited for use in all liquid media to which the plastic used is resistant. Suitable plastics are, for example, PE, PVC, PP, PVDE, as well as additional plastics used for pipeline systems.

The flowmeter of the invention permits a simple installation in existing pipeline systems. With respect to known systems, the flowmeter has a clearly enlarged measuring range, i.e., cavitation occurs only in the presence of relatively high speeds. An additional advantage lies in that the flowmeter leads merely to a slight loss in pressure and, with a minimum laid length, it requires an installation space which approximately corresponds to double the outer diameter of the pipe. Due to the absence of undercuts and dead spaces, the flowmeter of the invention is also suited for very pure media.

Additional advantages, characteristics and details of the invention become apparent in the subsequent description of a preferred example, as well as by means of the drawing which shows schematically in its single FIGURE a longitudinal crosssection through an ultrasonic flowmeter.

Referring to the drawing included herein, an ultrasonic flowmeter (10) for determining the flow rate or the flow quantity of a fluid has a central measuring tube (12) which widens on each side towards a respective antechamber (14). The antechambers (14), which subsequently again narrow, open into the connecting piece (16) for the installation of the ultrasonic flowmeter (10) into a pipeline system, not shown in the drawing. The connecting pieces (16) are arranged coaxially with respect to the measuring tube (12) and have the same interior diameter (d). The common pipe axis (x) defines the direction of flow.

In each antechamber (14), a housing (18) with an acoustic baffle (20), directed against the opening of the measuring tube (12), is arranged. The side of the housing (18) which is facing the connecting piece (16) is closed by means of a conical flow element (22) which can be screwed onto the housing (18) by a threaded portion (24). The housing (18) which, together with the conical flow element (22), forms a flow divider, serves to accommodate an ultrasonic transducer (26).

The attachment of the housing (18) inside the antechamber (14) takes place via molded-on support flanges (28) which grip into corresponding grooves (30) in the housing wall. Connection lines (32), leading to the ultrasonic transducer (26), are guided through the support flanges (28) and are connected outside the flowmeter (10) to an electronics unit (34).

The support flanges (28) provided on the housing (18) may also be connected to an orbiting ring (35), which is held by the central component (Z) and the end pieces (E).

The flowmeter (10) consists of a central component (Z) which comprises a measuring tube (12) and a port of the antechamber (14) and to which a second portion of the antechamber (14) with an integrated connecting piece (16) connects at each side to form the end piece (E). Here, the two parts of the antechamber (14) have mutually opposing recesses (30a, b), into which the support flanges (28) of the housing (18) are placed during assembly and which form the grooves (30) after the assembly has been completed.

Depending on the material used for the flowmeter (10), the central component (Z) is welded, glued or screwed together with the two end pieces or is connected in another manner. Depending on the type of connection, the support flanges (28) may be sealed inside the grooves via circumferential joints (36). The maintenance of the ultrasonic transducer (26), arranged inside the housing (18), is possible from the connecting pieces (16), with the opening of the housing (18) taking place simply by unscrewing the conical flow element (22).

The drawing clearly shows the advantageous relationship between the effective length (I) of the ultrasonic measuring section to the entire laid length (L) of the flowmeter (10).

I claim:

1. A device for measuring the flow rate of a fluid using ultrasound, said device comprising:

a measuring tube for receiving fluid flow therethrough, a first connecting piece mounted at a first end of said measuring tube, and a second connecting piece mounted at a second end of said measuring tube opposite said first end of said measuring tube, a first housing mounted between said first connecting piece and said measuring tube and in the path of fluid flow through said measuring tube, a second housing mounted between said second connecting piece and said measuring tube and in the path of fluid flow through said measuring tube, a first ultrasonic transducer mounted in said first housing and disposed at said first end of said measuring tube in the path of fluid flow through said measuring tube and a second ultrasonic transducer mounted in said second housing and disposed at said second end of said measuring tube in the path of fluid flow through said measuring tube, each of said first housing and said second housing including a radially outwardly formed flange, a first annular groove formed in said first end of said measuring tube and a second annular groove formed in said second end of said measuring tube, an annular groove formed in said first connecting piece and an annular groove formed in said second connecting piece, said annular groove of said first connecting piece and said first groove of said measuring tube being aligned and said radially outwardly flange of said first housing being disposed within said aligned grooves to removably mount said first housing and said first transducer in the fluid path of fluid passing through said measuring tube, said annular groove of said second connecting piece and said second groove of said measuring tube being aligned and said radially outwardly flange of said second housing being disposed within said aligned grooves to removably mount said second housing and said second transducer in the fluid path of fluid passing through said measuring tube, and said first connecting piece and said second connecting piece each being axially removably mounted to said measuring tube whereby to provide access to and removal of said housings and said transducers.

2. The device as defined in claim 1 and further comprising:

a first flow element carried by said first housing in the path of fluid flow through said measuring tube and a second flow element carried by said second housing in the path of fluid flow through said measuring tube, and said flow elements being axially removable from said housings upon rotation of said elements with respect to said housings.

* * * * *